United States Patent [19]

Higashi

[11] Patent Number: 4,647,649

[45] Date of Patent: Mar. 3, 1987

[54] METHOD OF PRODUCING AROMATIC POLYESTERS

[75] Inventor: Fukuji Higashi, Koganei, Japan

[73] Assignee: Tokyo University of Agriculture and Technology, Tokyo, Japan

[21] Appl. No.: 493,163

[22] Filed: May 10, 1983

[30] Foreign Application Priority Data

Sep. 3, 1982 [JP] Japan .................. 57-152760

[51] Int. Cl.$^4$ .................................. C08G 63/22
[52] U.S. Cl. ......................... 528/179; 528/180; 528/181; 528/182; 528/191
[58] Field of Search ............. 528/125, 126, 128, 173, 528/179–182, 176, 272, 274, 275, 298, 302, 304, 307, 308, 309, 321, 191

[56] References Cited

U.S. PATENT DOCUMENTS 3,637,601  1/1972  Truce et al. ................. 528/321
4,334,053  6/1982  Freitag et al. ................. 528/179
4,412,057  10/1983  Asada et al. ................. 528/126

*Primary Examiner*—Lucille M. Phynes
*Attorney, Agent, or Firm*—Burns, Doane, Swecker & Mathis

[57] ABSTRACT

A method of producing aromatic polyesters by polycondensation of diols and carboxylic acids, comprising polycondensating said diols and said dicarboxylic acids in the presence of a sulfur compound of a general formula:

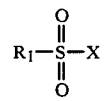

wherein $R_1$ represents a substituted or unsubstituted aryl, alkyl or aralkyl group, X represents a halogen atom.

3 Claims, No Drawings

METHOD OF PRODUCING AROMATIC POLYESTERS

BACKGROUND OF THE INVENTION

1. Field of the Invention

The present invention relates to a novel method of producing polyesters, particularly aromatic polyesters.

2. Description of the Prior Art

Among polyesters, aromatic polyesters have nowadays been used and promised as engineering plastics for many uses such as electric parts, electronic parts and automobile parts, because they have many splendid properties such as exceedingly high heat-resistant and wear-resistant properties and high glass-transition temperature. For producing such aromatic polyesters, there have been known methods such as solution polycondensation and interfacial polycondensation of diphenols and dicarboxylic acid dihalides, melt polycondensation of dicarboxylic acids and diacetates of diphenol and of diphenols and dicarboxylic acid diphenyl esters. These methods are indirect polymerization methods wherein dicarboxylic acid is first converted to dihalogenide thereof or diphenyl ester thereof which is further reacted with diphenol, or wherein diphenols are first converted to diacetate thereof which is further reacted with dicarboxylic acid, so that they have drawbacks that they are expensive in raw materials and cumbersome in process. Therefore, a method has been desired which can produce aromatic polyesters in a more simple and cheap way.

SUMMARY OF THE INVENTION

Considering the above described situation, the inventor has made many studies and experiments on methods of producing synthetic aromatic polyesters by direct reaction of dicarboxylic acids and diphenols whereby the inventor found and accomplished the present invention.

The present invention relates to a method of producing aromatic polyesters comprising, polycondensing directly diols and aromatic dicarboxylic acids to produce aromatic polyester easily and cheaply, in the presence of specific sulfur compound having a general formula

wherein $R_1$ represents a substituted or unsubstituted aryl, alkyl or aralkyl group, X represents a halogen atom.

An object of the present invention is to provide synthetic aromatic polyesters by direct polycondensation of at least one diol and at least one dicarboxylic acid having at least one benzene ring in the molecule, in the presence of said specific sulfur compound. The polycondensation is effected in at least one organic polar solvent.

Diols used in the present invention are expressed generally by the following formula

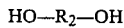 (1)

wherein $R_2$ is a bivalent aliphatic group, preferably alicyclic group, or aromatic group, preferably substituted or unsubstituted aryl or aralkyl group, or —$R_3$—Y—$R_4$— group, $R_3$ and $R_4$ are aromatic groups, preferably substituted or unsubstituted aryl groups, Y is an oxygen atom, sulfur atom, sulfonyl group, carbonyl group, alkylene group or alkylidene group. Illustrative examples of such diols are 1,4-cyclohexane diol, 1,4-dihydroxymethylbenzene, hydroquinone, resorcin, 1-chloro hydroquinone, 1,4-dihydroxynaphthol, 2,2'-bis(4-hydroxyphenyl)propane (hereinafter abridged as "bisphenol A"), 2,2'-bis(3,5-dichloro-4-hydroxyphenyl)propane, bis(4-hydroxyphenyl)methane, 4,4'-dihydroxydiphenyl, bis(4-hydroxyphenyl)ketone, bis(4-hydroxyphenyl)sulfone, bis(4-hydroxyphenyl)sulfine, etc. These compounds can be used alone or in admixture. Diols used in the present invention is not limited to said illustration in the above examples but all diols defined by the general formula (1) can be used.

Dicarboxylic acids having at least one benzene ring in the molecule used in the present invention are expressed generally by a formula

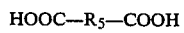 (2)

wherein $R_5$ represents a bivalent aromatic group having at least one benzene ring in the molecule. Illustrative examples of such dicarboxylic acids are terephthalic acid, isophthalic acid, methylterephthalic acid, methylisophthalic acid, naphthalene-1,5-dicarboxylic acid, bis(4-carboxylphenyl)sulfone, bis(4-carboxylphenyl)ketone, etc. These compounds can be used alone or in admixture.

Illustrative examples of the specific sulfur compound used in the present invention are methanesulfonyl chloride, benzenesulfonyl chloride, nitrobenzenesulfonyl chloride, chlorobenzenesulfonyl chloride, p-toluenesulfonyl chloride, 2,4,6-trimethylbenzenesulfonyl chloride, 2,4,6-triisopropylbenzenesulfonyl chloride, etc.

Suitable means of polymerizing the dicarboxylic acids and the diols is heating these monomers and the sulfur compound in an organic polar solvent containing a base. In this case, preferably equimolar amounts of the monomers are used and about 2–3 moles of the sulfur compound is used relative to one mole of the dicarboxylic acid. The sulfur compound of less than about 2 mole is not preferable because the effect of the sulfur compound cannot be exhibited, while the sulfur compound of larger than about 3 mole is not preferable, because the polymerization is obstructed.

As the above organic polar solvents used in the present invention, N-methylpyrrolidone, dimethylacetamide, dimethylsulfoxide, sulfolane and the like are referred. As the above base, pyridine, imidazole, 2-methylimidazole, triethylamine, quinoline and the like are preferred. If pyridine is used as the base, pyridine functions also as the organic polar solvent, so that an organic polar solvent may be omitted. The base functions as a reaction intermediate-forming agent as well as a HCl-scavenger and is preferably added to the sulfur compound in an equivalent amount or more.

In many cases, it is preferable to add and mix an auxiliary agent to the organic polar solvent for increasing the degree of polymerization of the polymer produced. For instance, polyester of a high molecular weight can be obtained by adding a metal salt such as lithium chloride LiCl to the organic polar solvent.

The polymerization is effected in the above-mentioned system by heating the reaction mixture at a temperature in a range of between ambient temperature and about 200° C., preferably about 80° C.–120° C. Usually, the reaction is effected at atmospheric pressure for a few or several hours. Concentration of the polymer is suitably about 1–20% by weight. Polymer concentration of less than about 1 wt% is not preferable because laborsome work is required in recovering the solvent, while polymer concentration of more than about 20 wt% is not preferable because the polymer of a desired molecular weight is difficult to obtain.

Polymer is isolated by pouring the reaction mixture into organic solvents such as lower alcohols or ketones or water, washing and drying.

DESCRIPTION OF THE PREFERRED EMBODIMENTS

Hereinafter, the present invention will be explained in more detail with reference to the preferred embodiments.

EXAMPLE 1

To a solution of 13 mmol of benzenesulfonyl chloride and 10 mmol of lithium chloride in 10 ml of pyridine is added a solution of 2.5 mmol of isophthalic acid and 2.5 mmol of terephthalic acid in 10 ml of pyridine. The mixture is agitated for 30 minutes at ambient temperature and subsequently subjected to aging treatment for a time as shown in the following Table 1 in an oil bath of 120° C. The resulting solution is treated with dropwise addition of 5 mmol of bisphenol A in 10 ml of pyridine for 20 minutes and further reacted for 3 hours in an oil bath of 120° C. The reaction mixture is poured in methanol to separate the polymer in nearly quantitative yield. Solution viscosity (logarithmic viscosity $\eta_{inh}$) of the polymer thus produced is measured in a solution consisting of 60 wt% of phenol and 40 wt% of 1,1,2,2-tetrachloroethane at 30° C. The result is shown together with weight-average molecular weight $\overline{M}w$ in the following Table 1.

TABLE 1

| Aging time (min) | Logarithmic viscosity ($\eta_{inh}$) | Weight-average molecular weight ($\overline{M}w$) |
|---|---|---|
| 5 | 0.96 | 54,000 |
| 10 | 1.05 | 62,000 |
| 20 | 1.39 | 82,000 |
| 30 | 0.94 | 52,000 |

EXAMPLE 2

Polymers are obtained in quantitative yield in a similar manner as in Example 1, except that the amount of lithium chloride is varied as shown in the following Table 2 and the aging time is 20 minutes. Solution viscosity ($\eta_{inh}$) and weight average molecular weight ($\overline{M}w$) of the polymers measured in the same way as in Example 1 are both described in the following Table 2.

TABLE 2

| LiCl (mmol) | Yield (%) | $\eta_{inh}$ | $\overline{M}w$ |
|---|---|---|---|
| 0 | 100 | 0.65 | 13,000 |
| 5 | 100 | 0.84 | 42,000 |
| 10 | 100 | 1.39 | 82,000 |
| 15 | 100 | 1.14 | 68,000 |
| 25 | 100 | 1.44 | 84,000 |

TABLE 2-continued

| LiCl (mmol) | Yield (%) | $\eta_{inh}$ | $\overline{M}w$ |
|---|---|---|---|
| 35 | 100 | 0.23 | — |

EXAMPLE 3

Polymers are obtained in a similar manner as in Example 1, except that various sulfur compounds as shown in the following Table 3 are used instead of benzensulfonyl chloride and aging time in 20 minutes. Solution viscosity ($\eta_{inh}$) and weight average molecular weight ($\overline{M}w$) of the polymers measured in the same way as in Example 1 are described in the following Table 3.

TABLE 3

| Sulfur compound | Yield (%) | $\eta_{inh}$ | $\overline{M}w$ |
|---|---|---|---|
| Methanesulfonyl chloride | 39 | — | — |
| p-Toluenesulfonyl chloride | 100 | 1.20 | 70,000 |
| 2,4,6-Trimethylbenzene-sulfonyl chloride | 100 | 0.78 | 2,4000 |

EXAMPLE 4

Polymers are obtained in quantitative yield in a similar manner as in Example 1, except that various diols as shown in the following Table 4 are used instead of bisphenol A and the aging time is 20 minutes. Solution viscosity ($\eta_{inh}$) of the polymers measured in the same way as in Example 1 is also shown in the following Table 4.

TABLE 4

| Kind of Diols | $\eta_{inh}$* |
|---|---|
| Resorcin | 0.38 |
| 2-Methylhydroquinone | 1.13** |
| 2-Chlorohydroquinone | 0.78** |
| 2,2'-Bis(3,5-dichloro-4-hydroxyphenyl)propane | 0.69 |
| Bis(4-hydroxyphenyl)ketone | 0.25** |
| Bis(4-hydroxylphenyl)sulfone | 0.34 |
| 1,4-Cyclohexanediol | 0.35 |
| 1,4-Hydroxymethylbenzene | 0.22 |

*Measured in a solution consisting of 60 wt % of phenol and 40 wt % of 1,1,2,2-tetrachloroethane at 30° C.
**Measured in p-chlorophenol at 45° C.

Although the present invention has been explained with reference to specific values and embodiments, it will of course be apparent to those skilled in the art that the present invention is not limited thereto and many variations and modifications are possible without departing from the broad aspect and scope of the present invention as defined in the appended claims.

What is claimed is:

1. A process for the preparation of an aromatic polyester, comprising directly polycondensing at least one aromatic diol having the formula:

$$HO-R_2-OH \qquad (1)$$

wherein $R_2$ represents a bivalent aromatic group, or an $R_3-Y-R_4$ group, $R_3$ and $R_4$ represent the same or different aromatic groups, Y represents an oxygen atom, sulfur atom, sulfonyl group, carbonyl group, alkylene group or alkylidene group with at least one aromatic dicarboxylic acid having the formula:

$$HOOC-R_5-COOH \qquad (2)$$

wherein $R_5$ represents a bivalent aromatic group, in at least one polar organic solvent, and in the presence of an effective amount of a sulfur compound having the formula:

   (3)

wherein X is halogen and $R_1$ is a substituted or unsubstituted aryl group, and in the presence of a metal salt which increases the polymerization degree of the aromatic polyester, under heating at a temperature of about 80°–120° C.

2. A process as defined in claim 1, wherein the aryl group of $R_1$ bears at least one inert substituent which is a chlorine atom, nitro group or alkyl group having from 1 to about 5 carbon atoms.

3. A process as defined in claim 1, wherein said metal salt is lithium chloride.

* * * * *